Mar. 20, 1923.

E. MOWRY ET AL

COMBINED SIDE DELIVERY RAKE AND TEDDER

Filed Apr. 29, 1918

1,448,812

Inventors
Edward Mowry
& Paul Kane,
by Chas. E. Lord
Atty.

Patented Mar. 20, 1923.

1,448,812

UNITED STATES PATENT OFFICE.

EDWARD MOWRY AND PAUL KANE, OF STERLING, ILLINOIS, ASSIGNORS, BY MESNE ASSIGNMENTS, TO INTERNATIONAL HARVESTER COMPANY, A CORPORATION OF NEW JERSEY.

COMBINED SIDE-DELIVERY RAKE AND TEDDER.

Application filed April 29, 1918. Serial No. 231,393.

*To all whom it may concern:*

Be it known that we, EDWARD MOWRY and PAUL KANE, citizens of the United States, and residents, respectively, of Sterling, in the county of Whiteside and State of Illinois, and of Sterling, in the county of Whiteside and State of Illinois, have invented certain new and useful Improvements in Combined Side-Delivery Rakes and Tedders, of which the following is a full, clear, and exact specification.

This invention relates to combined side delivery rakes and tedders and more particularly to the means for controlling the angularity of the rake teeth and for vertically adjusting the raking mechanism with respect to the ground.

One of the objects of the invention is to improve and simplify the construction of the rake tooth controlling mechanism and the mechanism for raising and lowering the rake structure.

Another object is to provide means whereby the rake mechanism may be vertically adjusted without affecting to any substantial degree the angular adjustment of the rake teeth.

A further object is to provide a construction wherein the rake shaft may be adjusted both vertically and horizontally to properly position the teeth and properly tension the driving mechanism.

With these objects in view the invention consists in means such as levers or equivalent devices or raising and lowering the raking mechanism, and in means such as a cam and roller, for controlling the angular adjustment of the rake teeth, as the rake is being rotated to perform its raking and tedding function.

One embodiment of our invention is illustrated in the accompanying drawings, and in these drawings,—

Figure 1:
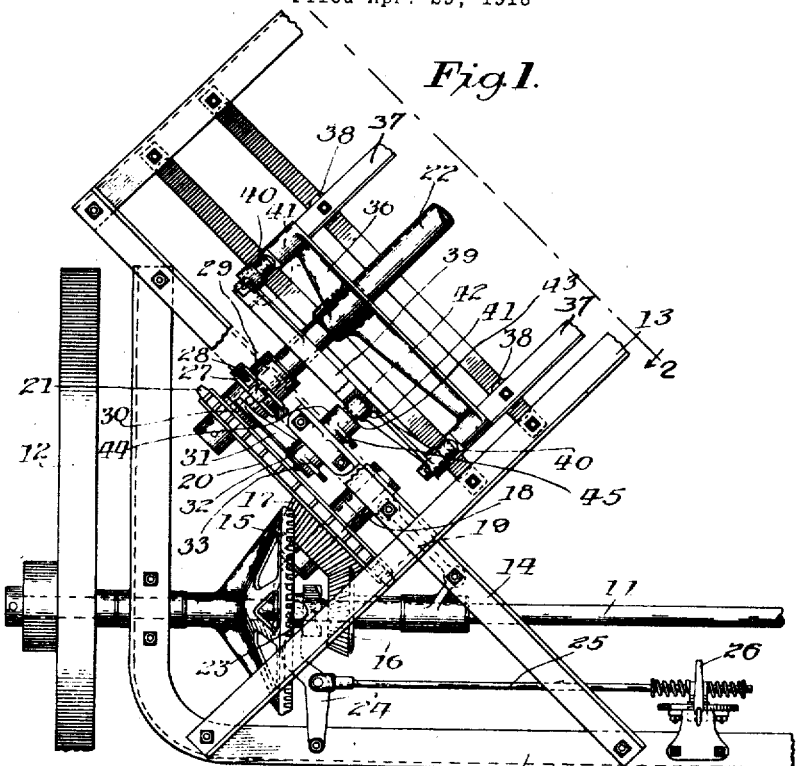
Figure 1 shows a fragmentary plan view of the improved controlling and adjusting mechanism.

For the sake of clearness only that portion of the construction of the combined side delivery rake and tedder has been illustrated, which embodies the particular invention now under consideration.

The machine is carried by the usual main frame 10 mounted on an axle 11 which in turn is supported by the carrying wheels 12 (only one of which is illustrated). The rake proper is carried by the diagonally disposed rearwardly extending frame 13 connected at its inner end to the frame 10, and also secured to a diagonal brace member 14 which is rigidly mounted on the main frame.

Suitable driving mechanism for the combined machine is provided, and in this instance consists in bevel gears 15 and 16, loosely mounted on the axle 11, and meshing with a bevel gear 17 carried by a bracket member 18 secured to the cross brace 14. The bevel gear 17 is formed integrally with, or has secured thereto, a sprocket 19 which is connected by a chain 20 to a sprocket 21 carried on the inner end of the rake shaft 22.

The bevel gears 15 and 16 are connected with the main axle 11 when desired, through a double-ended clutch member 23 which is splined to the axle 11 and is shiftable into engagement with either one of these gears 15 or 16 in order to drive the rake shaft in a suitable direction for raking or tedding, as the case may be. The clutch member 23 is shifted longitudinally of the axle 11 by means of any suitable lever mechanism, and in this instance is controlled by lever 24 connected through a link 25 to a shifting lever 26.

It should be understood that the specific construction above described is not essential to the successful operation of our invention, and that any other suitable construction for the same purpose may be substituted therefor.

The particular features outlined above in the objects of the invention and in the statement of the invention, will now be described, and first the mechanism for raising and lowering the rakes will be explained.

The inner end of the rake shaft 22 is journaled in a box 27 which is slidably mounted in a slotted bracket 28 adjustably secured to the cross brace 14 by bolts 27' which pass through slots 28' in the flanges of the bracket. The lateral adjustment of the bracket 28 on brace 14 enables the operator to properly tension chain 20 for efficient driving of the rake shaft. The box 27 is provided with an upwardly projecting eye 29 which is connected by a link 30 with an arm 31 secured to or formed integral with a sleeve 32, to which is secured a lever 33. The lever 33 is provided with the usual locking pawl 34 which cooperates in the usual manner with a notched or perforated segment member or sector 35 to lock the lever in any desired position of adjustment. By swinging the lever 33 about its pivot, the arm 31 is raised and lowered and with it the link 30, box 27 and rake shaft 22.

The means for adjusting the angularity of the rake teeth will next be described.

The rake shaft 22 has secured thereto a spider 36 and the rake heads 37 are journaled in the outer ends of the arms of the spider 36. These rake heads carry the rake teeth 38 which may be of any desired construction. In order to change the angle of the rake teeth during the rotation of the rake, a supplemental and eccentrically mounted spider 39 is provided, and this spider is connected to the spider 36 by means of cranks 40, so that as the rake shaft rotates, the spider 39 will be carried around with the spider 36.

The spider 39 has formed integrally therewith or has secured rigidly thereto, a circular cam track 41, the spider and cam track being freely suspended on crank 40 and the position of this cam track during the rotation of the rake shaft is controlled by means of a roller 42 which projects into the cam track and is carried at the lower or outer end of an arm 43 formed integral with or secured rigidly to a sleeve 44. The sleeve 44 is rotatably mounted on the same pivot which carries the lever 33 above described, and sleeve 44 has secured thereto an upwardly projecting lever 45 similar in construction to the lever 33. The lever 45 is also provided with suitable locking mechanism, such as a pawl, and the pawl cooperates with a notched or perforated sector in the same manner as the pawl 34 above described cooperates with the sector 35.

Figure 2:
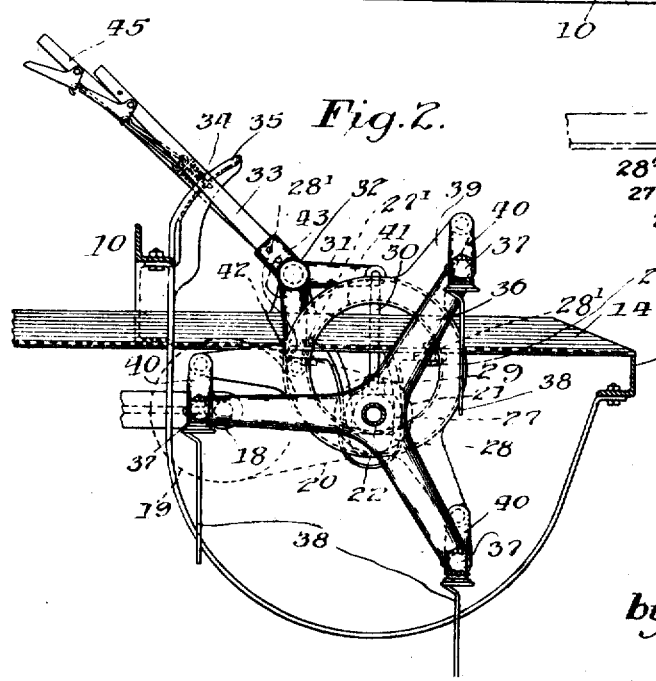
Fig. 2 is a side elevation partly in section taken on line 2—2 of Figure 1 looking in the direction of the arrows and, illustrating the rake adjusting and tooth controlling mechanism.
Figure 3:
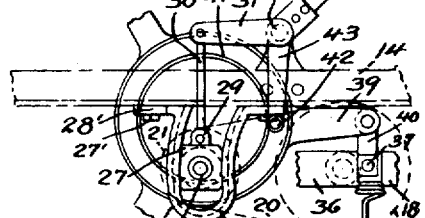
Fig. 3 is a detail view of the construction shown in Fig. 2 but looking in the opposite direction.

In Fig. 2 the rake teeth are shown as adjusted to their neutral or vertical position, and when it is desired to change the angle of the rake teeth, the lever 45 is swung about its pivot thereby rotating the arm 43, and through this arm and the roller 42 changing the position of the cam track 41, spider 39, and in this way through the cranks 40 rotating the rake heads and with them the rake teeth.

From the description and illustration it will be seen that the cam track 41 is moved substantially horizontally and as the cranks 40 are disposed vertically in their neutral position, any movement of these cranks in either direction will change the angle of the teeth with respect to the ground. Attention is also called to the fact that the vertical adjustment of the rake shaft by means of the lever 33, arm 31 and link 30, produces substantially no change in the angularity of the teeth, since the cam track 41 will be moved in a substantially vertical direction and the curvature of the cam track is on such a radius that the amount of movement required to adjust the teeth vertically with respect to the ground, produces substantially no engagement between the roller 42 and the walls of the cam track, and therefore the angle of the teeth remains substantially constant during this adjustment.

From the above description it will be seen that an exceedingly simple and practical construction has been provided for adjusting the raking mechanism and for changing the angle of the teeth when it is desired to change the machine from a rake to a tedder. The advantages resulting from the simplicity of the construction will be obvious.

While we have in the above specification described one embodiment of our invention, it will be understood that the invention is capable of modifications and that modifications may be used without departing from the spirit and scope of the invention as expressed by the following claims:

1. In a combined side delivery rake and tedder, a main frame, a rotary frame, rake teeth carried thereby, a cam supported by said rotary frame for controlling the movement of said rake teeth as said frame is rotated, means for vertically adjusting said frame and cam, and controlling means for said cam so positioned with respect to said cam that said rotary frame and cam may be vertically adjusted without changing the position of adjustment of said controlling means relative to said main frame.

2. In a combined side delivery rake and tedder, a main frame, a rotary frame, rake teeth carried thereby, means including a vertically movable cam for controlling the movement of said rake teeth as said rotary frame is rotated, and a control member for said cam, said cam and controlling member being so mounted with respect to each other that the cam may be moved vertically without changing the position of said controlling member with respect to said main frame.

3. In a combined side delivery rake and tedder, a rotary frame, rake teeth carried thereby, means including a cam for controlling the movement of said rake teeth as the rotary frame is rotated, and means for moving said cam in a horizontal direction at right angles to the longitudinal axis of said rotary frame.

4. In a combined side delivery rake and tedder, a frame, a rake shaft carried thereby, rake teeth operatively connected thereto, means including a cam for controlling the movement of said rake teeth during the rotation of said rake shaft, a roller supported by and movable about a pivot on said frame cooperating with said cam for determining the position thereof during rotation of said rake shaft, and means for adjusting said roller on said frame and thereby adjusting the position of said cam.

5. In a combined side delivery rake and tedder, a frame, a rake shaft carried thereby, a member secured to said rake shaft, rake heads rotatably mounted in said member and having rake teeth thereon, a second member operatively connected to said rake heads and having a cam, and means for adjusting said second member and cam in a substantially horizontal direction thereby controlling the angular movement of said rake teeth during the rotation of the rake shaft.

6. In a combined side delivery rake and tedder, a frame, a rake shaft carried thereby, a spider secured to said rake shaft, rake heads rotatably mounted in the outer ends of said spider, a second spider operatively connected to said rake heads, a cam carried by said second spider, and means pivotally suspended from said frame for controlling the position of said cam.

7. In a combined side delivery rake and tedder, a frame, a rake shaft carried thereby, a spider carried by said rake shaft, rake heads rotatably mounted in the outer ends of said spider and having rake teeth secured thereto, crank arms carried by said rake heads, a second spider connected to said crank arms and having a cam disposed centrally thereon, and means pivoted on said frame and including a roller for controlling the position of said cam.

8. In a combined side delivery rake and tedder, a frame, a rake shaft, means for adjustably securing said rake shaft to said frame, a member carried by said rake shaft having outwardly projecting arms, rake heads rotatably carried by said outwardly projecting arms, rake teeth carried by said rake heads, crank arms carried by said rake heads and disposed substantially vertically when said rake teeth are in vertical position, a member secured to said crank arms and having a centrally disposed cam, and means for adjusting the position of said cam, said means being located substantially on the horizontal axis of the cam when said rake teeth are disposed in a vertical position.

9. In a combined side delivery rake and tedder, a frame, a rake shaft, means for vertically adjusting said rake shaft on said frame, rake teeth operatively connected to said rake shaft, means including a cam for controlling the movement of said rake teeth as said rake shaft is rotated, means mounted on said frame for adjusting the position of said cam thereby varying the angularity of said rake teeth, said last named means being disposed eccentrically with respect to said rake shaft and so located with respect to said rake shaft and said cam that a vertical adjustment of the rake shaft produces substantially no horizontal movement of said cam.

10. In a combined side delivery rake and tedder, a frame, rotary raking mechanism carried thereby having rake teeth, means for controlling the movement of said teeth as said raking mechanism rotates, means for adjusting said controlling means laterally, and separate means for adjusting said raking means and controlling means vertically.

11. In a combined side delivery rake and tedder, a frame, a rake head supported thereon and having spaced apart rake teeth, means for controlling the position of said rake teeth, and means including a depending crank pivoted on said frame for varying the position of said controlling means.

12. In a combined side delivery rake and tedder, a frame, a rake head supported thereby and having rake teeth thereon, a cam for controlling the position of said rake teeth, and means including a crank pivoted on and depending from said frame for varying the position of said cam.

13. In a combined side delivery rake and tedder, a main frame, a rotary frame, rake teeth carried thereby, a cam supported by said rotary frame for controlling the movements of said rake teeth as said frame is rotated, means mounted on said main frame for vertically adjusting said rotary frame and cam, and controlling means mounted on said main frame for adjusting said cam so positioned with respect to said cam that said rotary frame and cam may be vertically adjusted without changing the position of adjustment of said controlling means.

14. In a combined side delivery rake and tedder, a main frame, a rotary frame, rake teeth carried thereby, a cam mounted on said rotary frame to adjust the angularity of said teeth and separate means pivotally mounted on said frame for vertically adjusting said rotary frame and adjusting the angularity of said rake teeth.

15. In a combined side delivery rake and tedder, a main frame, a rotary frame, angularly adjustable rake teeth carried thereby, means for vertically adjusting said rotary frame and means pivoted to said main frame and independent of said first named means for adjusting the angularity of said rake teeth.

In testimony whereof we affix our signatures, in the presence of two witnesses.

EDWARD MOWRY.
PAUL KANE.

Witnesses:
   C. F. JANSSEN,
   T. Y. ANDREAS.